(12) United States Patent
Petrucelli

(10) Patent No.: US 7,383,724 B2
(45) Date of Patent: Jun. 10, 2008

(54) HAND HELD TIRE PRESSURE GAUGE AND METHOD FOR ASSISTING A USER TO DETERMINE WHETHER A TIRE PRESSURE IS WITHIN A TARGET RANGE USING A HAND-HELD TIRE PRESSURE GAUGE

(75) Inventor: Steven Petrucelli, Cranbury, NJ (US)

(73) Assignee: Measurement Limited

( * ) Notice: Subject to any disclaimer, the term of this patent is extended or adjusted under 35 U.S.C. 154(b) by 0 days.

(21) Appl. No.: 11/648,935

(22) Filed: Jan. 3, 2007

(65) Prior Publication Data

US 2007/0180899 A1 Aug. 9, 2007

Related U.S. Application Data

(63) Continuation of application No. 11/051,650, filed on Feb. 4, 2005, now Pat. No. 7,251,992, which is a continuation-in-part of application No. 10/688,182, filed on Oct. 17, 2003, now Pat. No. 6,901,792.

(51) Int. Cl.
*G01M 17/02* (2006.01)
(52) U.S. Cl. ....................................... 73/146
(58) Field of Classification Search ........ 73/146–146.8
See application file for complete search history.

(56) References Cited

U.S. PATENT DOCUMENTS 6,817,235 B2 * 11/2004 Sapir ........................... 73/146
6,838,983 B1 * 1/2005 Wong ......................... 340/442
7,013,722 B2   3/2006 Little et al.
7,040,153 B2 * 5/2006 Kroll et al. .................... 73/146
7,185,533 B2 * 3/2007 Lee et al. ...................... 73/146
2005/0103108 A1 5/2005 Little et al.
2005/0138999 A1 6/2005 Petrucelli

FOREIGN PATENT DOCUMENTS

| DE | 198 37 550 A1 | 2/1999 |
| GB | 2169411 A | 7/1986 |
| GB | 2169411 A | 7/1986 |
| WO | WO 96/07568 | 3/1996 |

OTHER PUBLICATIONS

UK Search Report dated Feb. 15, 2006 from corresponding UK Patent Application No. GB0520841.8.

* cited by examiner

*Primary Examiner*—Andre J. Allen
*Assistant Examiner*—Jermaine Jenkins
(74) *Attorney, Agent, or Firm*—Howard IP Law Group PC

(57) ABSTRACT

A handheld tire pressure gauge including: a display; a pressure sensor; a memory; a processor being operatively coupled to the display, pressure sensor and memory; and, code being stored in the memory and operable by the processor to: retrieve at least one value indicative of a target tire pressure from the memory, determine a pressure sensed by the pressure sensor, and, cause the display to present information indicative of the target tire pressure and sensed pressure.

21 Claims, 7 Drawing Sheets

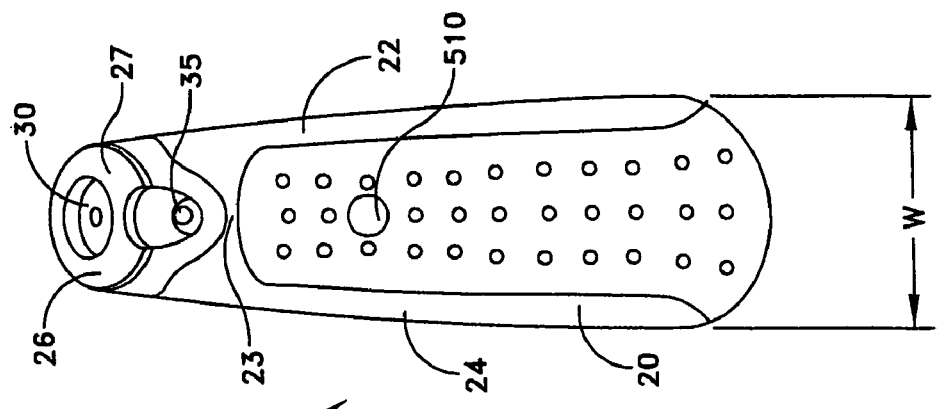
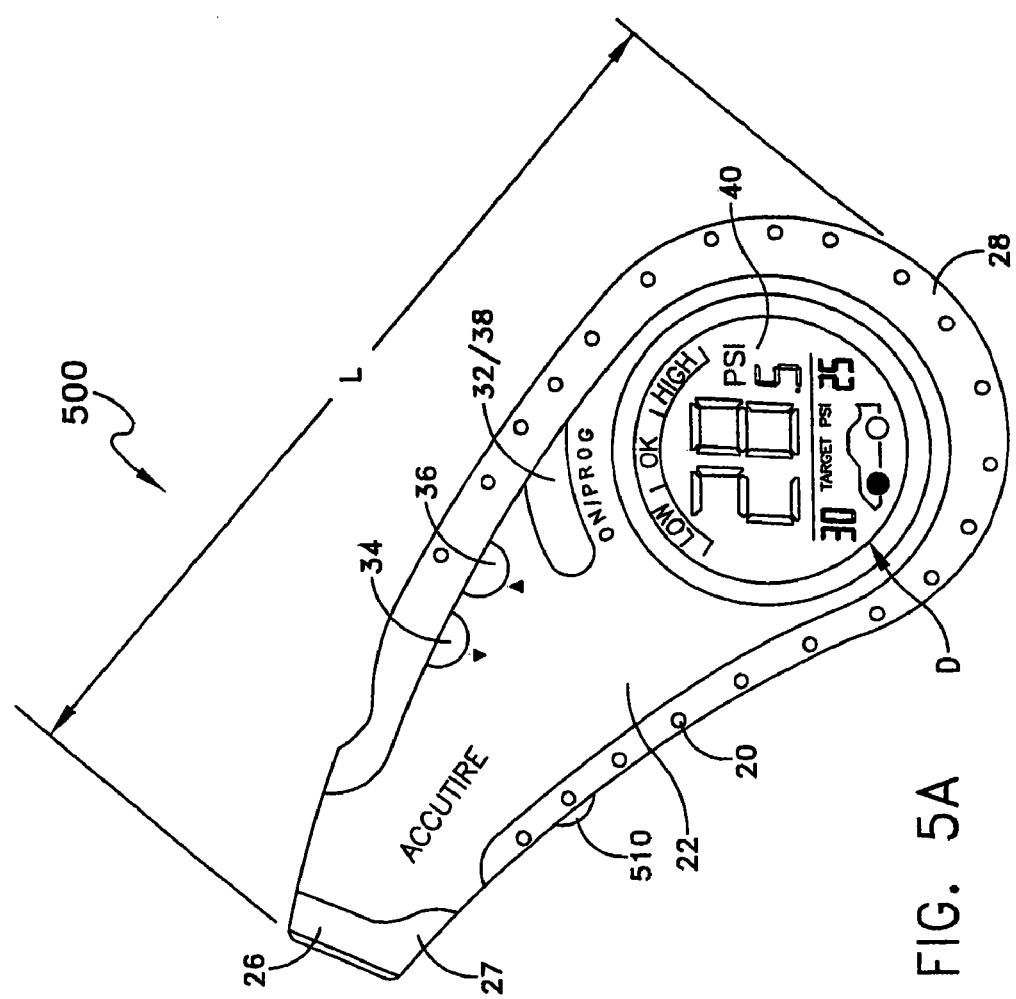

HAND HELD TIRE PRESSURE GAUGE AND METHOD FOR ASSISTING A USER TO DETERMINE WHETHER A TIRE PRESSURE IS WITHIN A TARGET RANGE USING A HAND-HELD TIRE PRESSURE GAUGE

RELATED APPLICATION

This application is a continuation of U.S. patent application Ser. No. 11/051,650, entitled HAND-HELD TIRE PRESSURE GAUGE AND METHOD FOR ASSIGNING A USER TO DETERMINE WHETHER A TIRE PRESSURE IS WITHIN A TARGET RANGE USING A HAND-HELD TIRE PRESSURE GAUGE, filed Feb. 4, 2005 now U.S. Pat. No. 7,251,992, which is a continuation-in-part of U.S. patent application Ser. No. 10/688,182, entitled RECALL MECHANISM FOR A PRESSURE GAUGE, filed Oct. 17, 2003 now U.S. Pat. No. 6,901,792, the entire disclosure of which is hereby incorporated by reference as if being set forth in its entirety herein.

FIELD OF THE INVENTION

The present invention relates to pressure measurement and pressure gauges.

BACKGROUND OF THE INVENTION

Pressure gauges are conventionally used for measuring the pressure of a gas or a liquid, such as an air pressure. Tire pressure gauges, as an example, measure the inflation pressures of vehicle tires, such information being useful for maintaining optimal tire performance and avoiding unnecessary wear. Conventional tire pressure gauges typically use calibrated rods or sliding scales for conveying readings to the user. Such devices, however, are frequently difficult to read properly and often produce inaccurate readings. Digital tire pressure gauges typically allow for more accurate measurements and incorporate features such as backlit liquid-crystal displays (LCDs) that facilitate both day and night readings. However, present digital pressure gauges, while achieving more accurate pressure readings, nevertheless lack certain features and capabilities for communicating additional useful information associated with the measured pressure reading.

SUMMARY OF THE INVENTION

A handheld tire pressure gauge including: a display; a pressure sensor; a memory; a processor being operatively coupled to the display, pressure sensor and memory; and, code being stored in the memory and operable by the processor to: retrieve at least one value indicative of a target tire pressure from the memory, determine a pressure sensed by the pressure sensor, and, cause the display to present information indicative of the target tire pressure and sensed pressure.

BRIEF DESCRIPTION OF THE DRAWINGS

Understanding of the present invention will be facilitated by considering the following detailed description of the preferred embodiments of the present invention taken in conjunction with the accompanying drawings, in which like numerals refer to like parts, and:

FIGS. 5A and 5B illustrate views a tire pressure gauge according to an aspect of the present invention; and, FIG. 6 illustrates a display suitable for use with the gauge of FIGS. 5A and 5B according to an aspect of the present invention.

DETAILED DESCRIPTION OF THE PREFERRED EMBODIMENTS OF THE INVENTION

It is to be understood that the figures and descriptions of the present invention have been simplified to illustrate elements that are relevant for a clear understanding of the present invention, while eliminating, for the purpose of clarity, many other elements found in typical pressure sensing systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

Further, it should be understood that the several views of the housings, displays and general configurations shown in the figures include many decorative or ornamental features, aspects of which the particulars may be changed while maintaining the device's utility and without departing from the scope and spirit of the present invention.

Figure 1A:
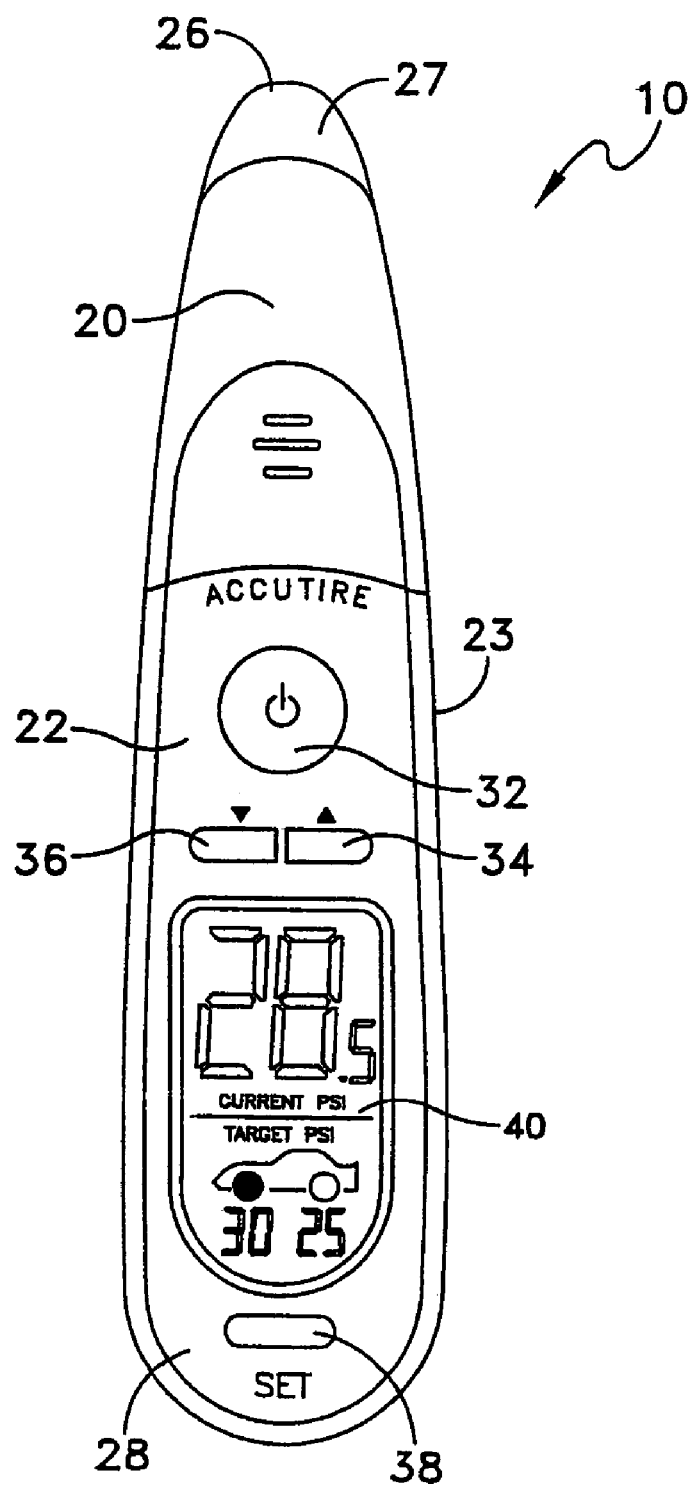
FIGS. 1A, 1B and 1C illustrate various views of a tire pressure gauge according to an aspect of the present invention.
Figure 1B:
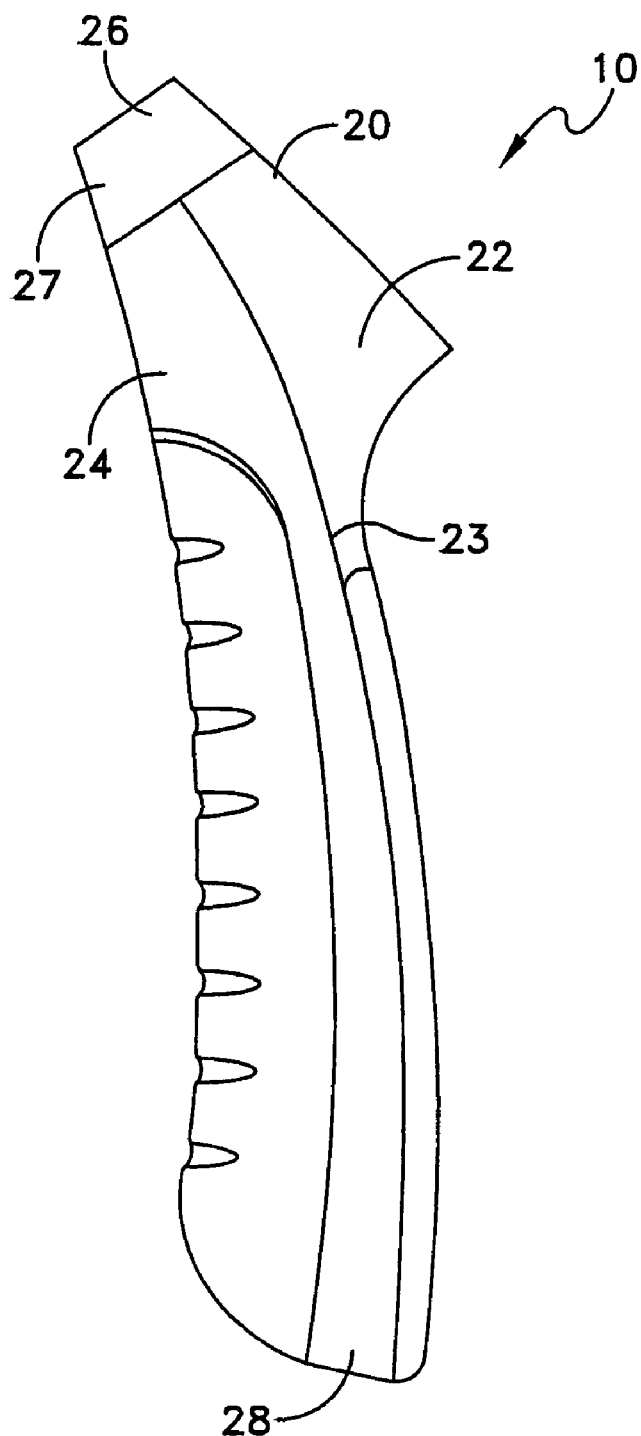

FIGS. 1A and 1B illustrate views of a pressure sensing device, or gauge, 10 according to an aspect of the present invention. Gauge 10 generally includes a housing 20 constructed of a durable material, such as acrylonitrile butadiene styrene (ABS). In the illustrated and non-limiting embodiment, housing 20 includes a top portion 22 and bottom portion 24 joining at peripheral edge 23. Housing 20 generally defines a proximal head end 26 and distal butt end 28. Top and bottom portions 22, 24 may be coupled together in any suitable manner, including, for example, screws, rivets, snap-fitting, adhesives, welding and the like. Of course, housing 20 may alternatively be monolithic in structure. Housing 20 may optionally include a cap 27 nearest proximal end 26. Cap 27 may be coupled over parts of portions 22, 24 and/or extend outwardly there from.

Figure 1C:
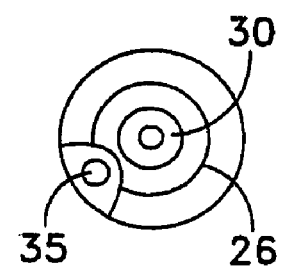

Referring now also to FIG. 1C, a port 30 is disposed at proximal head end 26 for applying the gauge to a measuring point, such as the valve stem of a tire. "Port", as used herein, generally refers to an opening. A port generally allows a physical sensor to be subjected to one or more characteristics of a media, such as pressure, for example. Port 30 contains a mechanism, such as a rubber seal and pin arrangement, which communicates with a pressure sensor located within housing 20. The invention also anticipates the incorporation of other conventionally known mechanisms for providing access to a pressure measured. In the illustrated embodiment, pressure gauge 10 takes the form of a handheld gauge, suitable for measuring air pressure contained in a tire using a conventional tire inflation valve stem. However, the invention is applicable to various other pressure gauges, particularly other hand-held pressure gauges, as well.

Device 10 may optionally include a lighting element 35 positioned substantially adjacent to port 30. Lighting element 35 may take the form of any conventional light emitting element suitable for being incorporated into end 26 of housing 20, such as a light emitting diode (LED), for example. The selection of lighting element 35 may be based upon other criteria as well, such as the power limitations of device 10 (e.g., available voltage/current from internal batteries) as well. Element 35 may be positioned with respect to port 30 to facilitate user coupling of port 30 to a tire valve stem in poor ambient lighting conditions, for example. Port 30 and lighting element 35 may be included within cap 37.

Referring again to FIG. 1A, device 10 further includes a user interface on the top portion 22 for providing visual display of the sensed pressure reading, as well as for providing user input for device 10. In the illustrated, non-limiting embodiment of FIGS. 1A-1C, the user interface includes a power selector 32, an incrementing selector 34, a decrementing selector 36, a set selector 38 and a display 40. Selectors 32, 34, 36 and 38 and display 40 collectively provide a user interface for device 10 according to an aspect of the present invention. Selectors 32, 34, 36 and 38 may take the form of user activatable or depressible buttons or switches, for example. Display 40 may take the form of a backlit, multi-segment liquid crystal display (LCD). Of course, other configurations may also be used to provide for user interface functionality.

Figure 2:
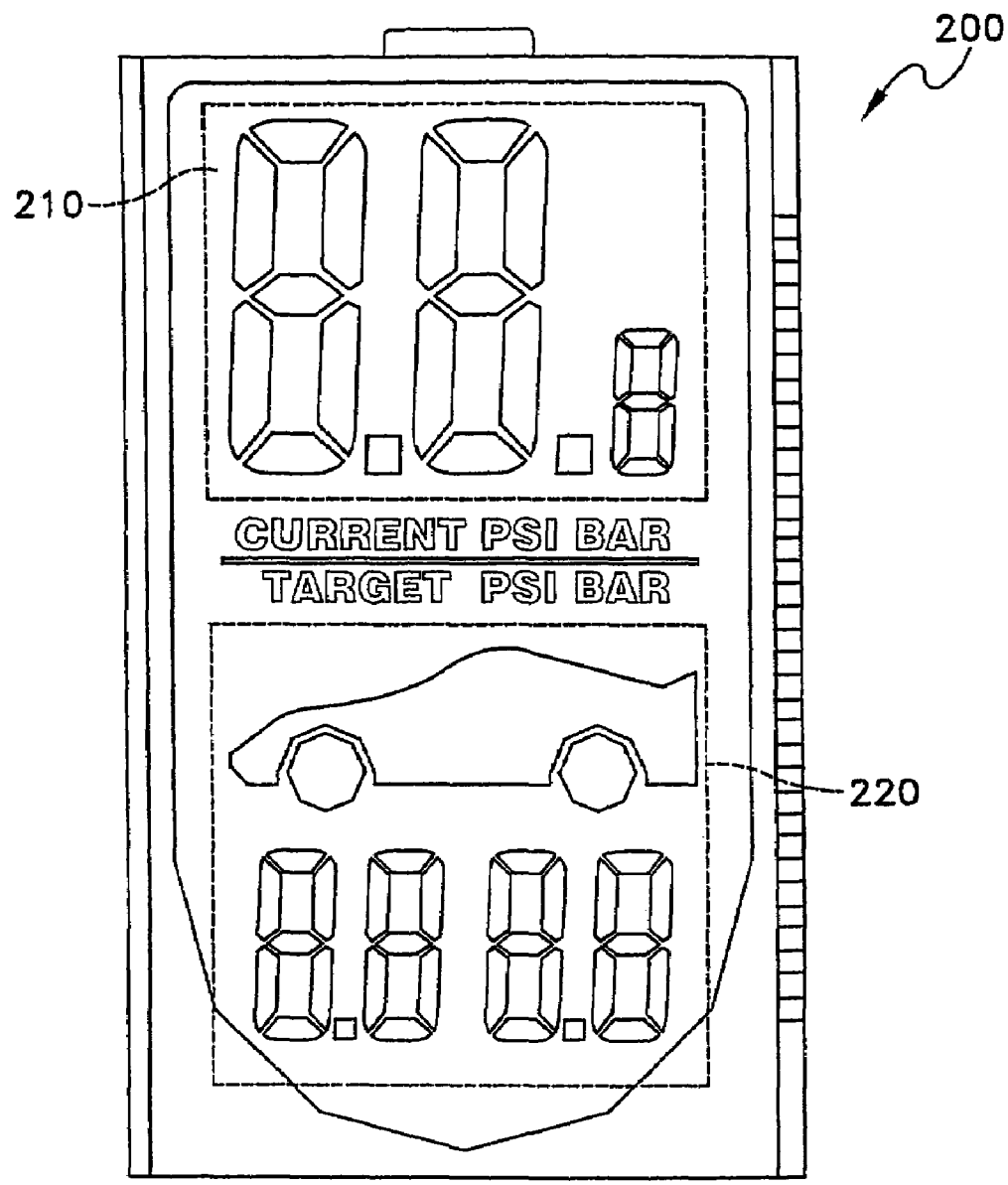
FIG. 2 illustrates a display suitable for use with the gauge of FIGS. 1A, 1B and 1C according to an aspect of the present invention.

Referring now also to FIG. 2, there is shown a plan view of a display 200 suitable for use as display 40 of FIG. 1A. The illustrated display 200 includes a plurality of liquid crystal display segments, as will be well understood by those possessing an ordinary skill in the pertinent art. As will also be understood, other types of displays may alternatively be used without departing from the scope and spirit of the invention, however. In one configuration, a display 200 may be a backlit display. Display 200 may be backlit with a color substantially matching the color of lighting element 35, for example. Alternatively, display 200 may be backlit with a color substantially complementary to that of lighting element 35, for example. Of course, it is also understood that display 200 need not be a backlit device.

In an exemplary embodiment, display 200 includes a first display portion 210 and second display portion 220. First display portion 210 displays a reading indicative of a pressure last measured using device 10 (e.g., using port 30). Second display portion 220 displays information corresponding to the entity being measured and displayed in first display portion 210, including but not limited to an indicator of the particular tire whose pressure is being measured (e.g. left front, right front, left rear, right rear, etc.) a desired target pressure, and/or graphical or other indicia.

In the illustrated display 200, portion 220 displays target or desired pressures for different tires of a vehicle, such as front and rear target tire pressures. These target pressures may be considered analogous to tire pressure set points according to an aspect of the present invention. As used herein, "set point" generally refers to a user configurable, or preconfigured, value or condition. In the illustrated display 200, the set points may correspond to manufacturer suggested tire inflation pressures for the front and rear tires of a vehicle, for example. These sets points may be stored in a memory of the device for retrieval and/or modification by the user.

Device 10 may optionally include a speaker for emitting audible signals (e.g. voice recordings or emulations) indicative of the information displayed in portions 210 and/or 220. A recall mechanism responsive to a stimulus, such as, for example, depression of power selector 32 without application of a pressure via port 30, may cause previously stored value(s) to be displayed using portions 210 and/or 220, for example.

Figure 3:
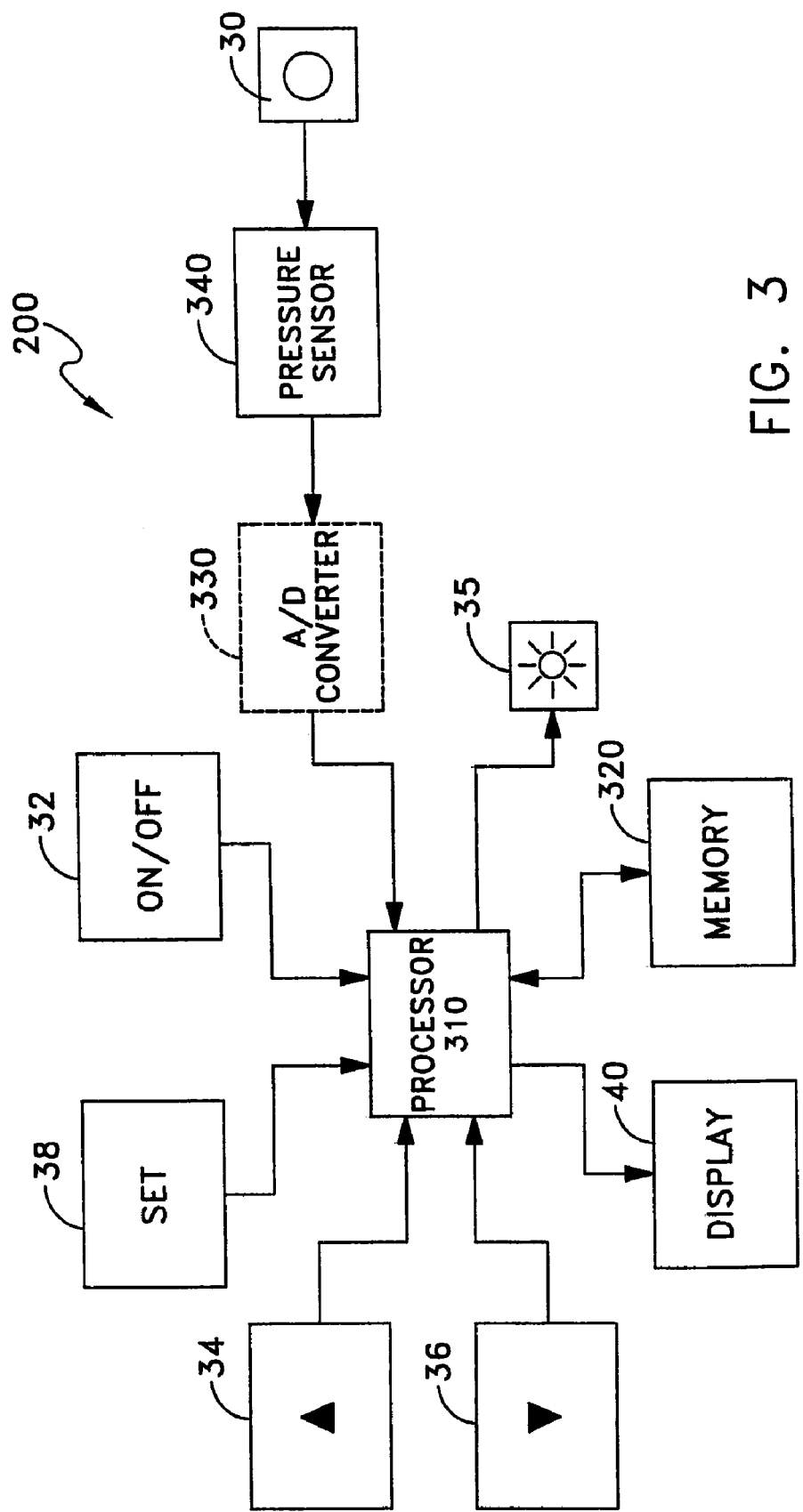
FIG. 3 illustrates a block diagrammatic representation of a system suitable for use with the gauge of FIGS. 1A, 1B and 1C.

As set forth above, device 10 includes a pressure sensor located within housing 20. Referring now also to FIG. 3, there is shown a block diagrammatic view of an arrangement 300 suitable for use within housing 20 of FIG. 1A-1C. Arrangement 300 generally includes a processor 310, memory 320, optional analog to digital converter 330 and pressure sensor 340.

"Processor", as used herein, generally refers to a circuit arrangement that may be contained on one or more silicon chips, and/or integrated circuit (IC) boards, and that contains a Central Processing Unit (CPU). The CPU may generally include an arithmetic logic unit (ALU), which performs arithmetic and logical operations, and a control unit, which extracts instructions from memory and decodes and executes them, calling on the ALU when necessary.

Processor 310 may take the form of a microprocessor, by way of non-limiting example only. The present invention is operable with computer storage products or computer readable media that contain program code for performing the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter.

Processor 310 may include multiple inputs and outputs. In the exemplary configuration illustrated in FIG. 3, processor 310 has an input coupled to power selector 32. Processor 310 also has an input coupled to incrementing selector 34. Processor 310 further includes inputs coupled to decrementing selector 36 and to set selector 38. An output of processor 310 is coupled to display 40. Processor 310 may also be coupled to memory 320 to allow it to access its data contents. Processor 310 may have an output coupled to lighting element 35 and an input coupled to pressure sensor 340 and communicative with port 30, optionally via analog-to-digital converter (A/D) 330. For example, where pressure sensor 340 provides an analog output signal indicative of a pressure sensed using port 30, A/D converter 330 may communicate a digital signal indicative of the analog signal output from pressure sensor 340 to processor 310. Where pressure sensor 340 provides a digital signal directly, A/D converter 330 may optionally be omitted. Also, where processor 310 is adapted to receive analog signals output from pressure sensor 340 directly, A/D converter 330 may optionally be omitted. A/D converter 330 may be selected based upon size limitations of housing 20, an expected output from pressure sensor 340, accepted input for processor 310 and available power sources (not shown) for device 10 (such as one or more batteries contained within housing 20), for example.

Memory 320 may be internal or external to processor 310. As used herein, "memory" refers generally to one or more devices capable of storing data, such as in the form of chips, tapes or disks. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only.

Memory 320 may store information, e.g., data, indicative of set points for specific tires, and/or vehicles and/or previous measurements. For example, memory 320 may store user input, or preset, data indicative of one or more set points for one or more tires for one or more vehicles. Memory 320 may further store data indicative of previous measurements associated with the same one or more tires for one or more vehicles. By way of further non-limiting example only, memory 320 may store: (1) a set point and last measurement corresponding to the front tires of a first vehicle; (2) a set point and last measurement corresponding to the rear tires of the first vehicle; (3) a set point and last measurement corresponding to the front tires of a second vehicle; and, a set point and last measurement corresponding to the rear tires of the second vehicle. Which tires for which vehicle are going to be measured by a user may be selected using the user interface, such that the appropriate sets of data are retrieved for use and display by processor 310 and display 40. Of course, other information, such as other sets of data, may also be stored using memory 320. The information may be stored and retrieved by means of one or more lookup tables, for example, that associate the vehicle information (e.g. vehicle $ID_1$, vehicle $ID_2$, . . . , vehicle $ID_n$) with particular set point data associated with corresponding one or more tires of the given vehicle (i.e. the vehicle selected). In one configuration, a vehicle indicator selection input for enabling user selection of a given one of a plurality of vehicle indicators may be provided, each indicator corresponding to a particular vehicle having corresponding tire pressure set points stored in memory and associated with that vehicle. The processor, in communication with the user interface, is responsive to the input selection for retrieving from memory those target values corresponding to the selected vehicle for processing and display to the user.

Pressure sensor 340 may take the form of any conventional pressure sensor suitable for providing an output signal indicative of a pressure applied at port 30. Pressure sensor 340 may be selected based upon size limitations of housing 20, accepted inputs for processor 310 and available power sources (not shown) for device 10 (such as one or more batteries contained within housing 20), for example. Pressure sensor 340 may take the form of a conventional strain gauge based sensor, for example. Such a sensor may be excited using available power sources (not shown) for device 10 (such as one or more batteries contained within housing 20).

Figure 4:
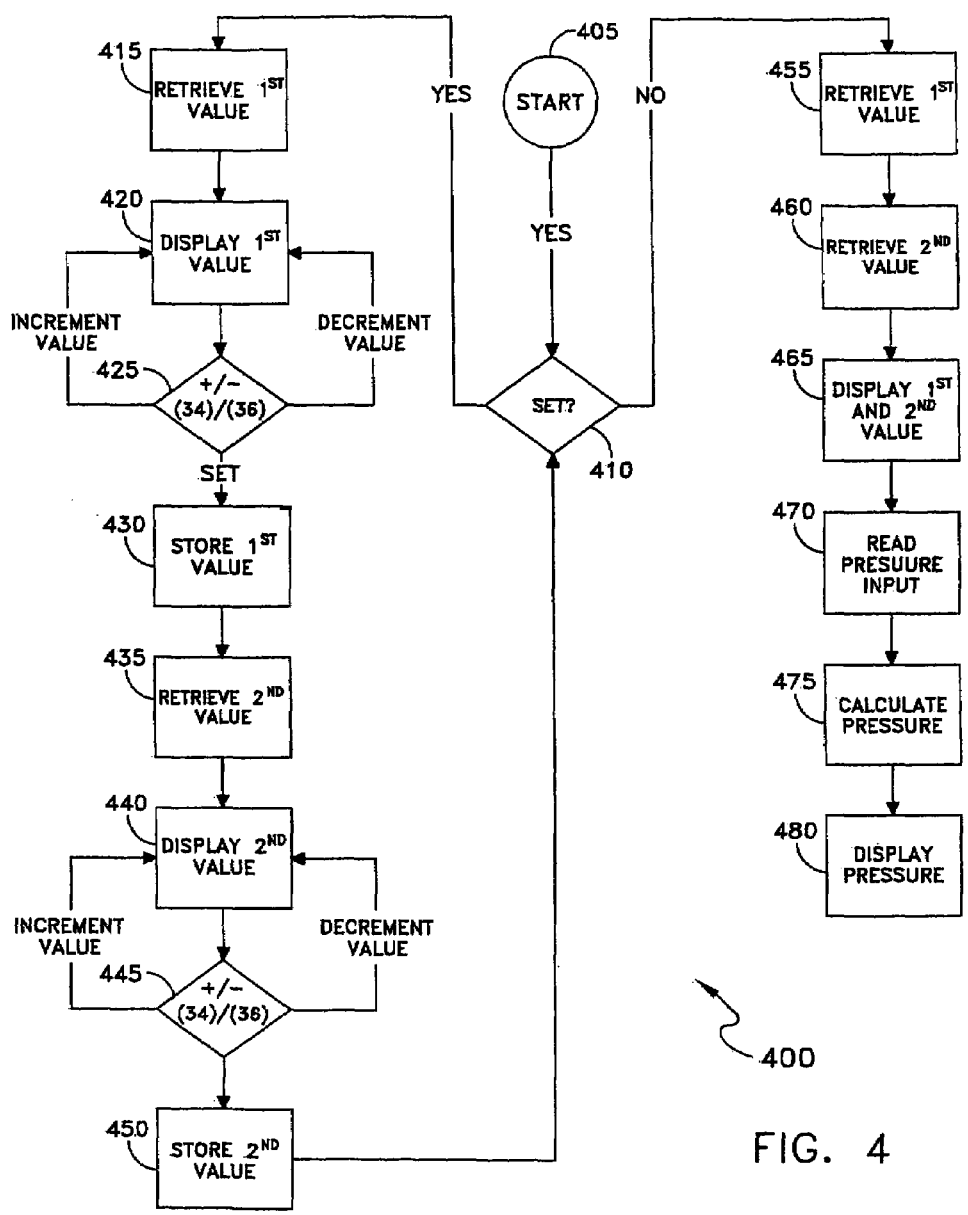
FIG. 4 illustrates a block diagrammatic representation of a process suitable for use with the gauge of FIGS. 1A, 1B and 1C according to an aspect of the present invention.

Referring now also to FIG. 4, there is shown a block diagrammatic representation of a process 400 according to an aspect of the present invention, and being suitable for use with gauge 10 of FIGS. 1A-1C. Gauge 10 may be turned on by activating power selector 32. This may serve to provide power to processor 310, in order to activate it, or such selection may be sensed by processor 310 to cause it to switch into an active mode 405. Upon activation, microprocessor 310 may optionally have certain initialization procedures it follows, such as checking memory and/or calibrating one or more inputs, for example. Device 10 may then check to see if the set selector 38 has been activated 410.

If selector 38 has been activated, processor 310 may retrieve 415 a first value from memory 320. The first value may be a set point associated with one or more tires of a vehicle, for example (e.g. left front; right front; left, right, etc.). In an exemplary configuration, the first value may be associated with the target pressure for the front tires of a vehicle, for example. The memory can be configured to store initial default values for the set points such as 0, 15 or 30, PSI all by way of non-limiting example. In one configuration, the set point memory values of device 10 are configured so as to be associated with a particular type of vehicle or particular type of tire, whereby the default set point values indicate the manufacturer recommended tire inflation for the pre-associated vehicle or tire. For example, where the device 10 is distributed in connection with new tires for a vehicle, tire installation personnel may define the first set point prior to providing the device to the vehicle operator. As will be evident to one possessing an ordinary skill in the pertinent arts, user selection and operation of the device will cause the processor to retrieve the manufacture recommended target pressure data from memory for display. The user may utilize the selection buttons to adjust or modify the pre-configured values and store modified values in memory such that subsequent operation will cause the modified values to be retrieved and displayed (process step 415). The device 10 may also be reset in a conventional manner, whereupon the initial default values (e.g. manufacturer recommended values) may be retrieved again.

Referring again to FIG. 4, the retrieved first value is displayed 420 using display 40. The first value may be displayed using a part of display portion 220 indicative of the one or more tires of a vehicle with which the first value is associated. The graphical representation itself may be adapted to indicate which of the tires is currently being set by process 400. In the illustrated case of FIG. 1A, the graphical representation is adapted to show the first value being set is indicative of a pressure target or set point for the front tire(s) of a vehicle.

Processor 310 may then determine whether incrementing selector 34 or decrementing selector 36 is activated at process step 425. If incrementing selector 34 is activated, the first value may be incremented by a predetermined step value, such as ½ or 1, unit (e.g. PSI) and the amended value displayed 420. If decrementing selector 36 is activated, the first value may be decremented by a predetermined step value, such as ½ or 1 PSI, and the amended value displayed 420. The incrementing/decrementing and displaying may be repeated until a desired value, indicative of the desired target pressure or set point for the associated tire(s) represented by the graphical representation of display portion 220, is displayed.

Once processor 310 senses set selector 38 has been activated to indicate the optionally amended value is the desired value, it may store 430 the optionally amended first value in memory 320.

Processor 310 may then retrieve 435 a second value from memory 320. The second value is akin to the first value, except that it is associated with different tire(s) of the vehicle, e.g., the rear tire(s). The second value may analogously be displayed using a part of display portion 220 indicative of the one or more tires of a vehicle with which the second value is associated. For example, the second value may be displayed substantially adjacent to a graphical representation of the rear tire(s) of a vehicle. The graphical representation itself may again be adapted to indicate which of the tires is currently being set by process 400.

Processor 310 may then sense whether incrementing selector 34 or decrementing selector 36 is activated at process step 445. If incrementing selector 34 is activated, the second value may be incremented by a predetermined step value, such as ½ or 1 PSI, and the amended second value displayed 440. If decrementing selector 36 is activated, the second value may be decremented by a predetermined step value, such as ½ or 1 PSI, and the amended second value displayed 440. The incrementing/decrementing and displaying may be repeated until a desired value, indicative of the desired target pressure or set point for the associated tire(s) represented by the graphical representation, is displayed.

Once processor 310 senses set selector 38 has been activated to indicate the optionally amended value is the desired value, it may store 450 the optionally amended second value in memory 320.

Processor 310 may then return to process step 410. According to an aspect of the present invention, the sensing of activation of set selector 38 may be treated as a processing interrupt at any processing step other than those designated 415-450, inclusive, whereupon detection of such causes the processor 310 to proceed to step 415.

Thus, where an activation of set selector 38 is not sensed by processor 310, processor 310 may proceed to process step 455, where the first value is retrieved from memory 320. The second value may also be retrieved 460 from memory 320. The first and second values are displayed 465. Retrieving process steps 455, 460 and displaying step 465 may optionally be omitted where processor 310 has previously accessed the first and second values and is currently causing them to be displayed using portion 220 of display 40, for example.

Processor 310 may then monitor 470 for an input indicative of a *pressure to be sensed from pressure sensor 340. For example, once an input from pressure sensor 340 (that may be converted to digital form using A/D converter 330) exceeds a given threshold, the input may be processed 475 to calculate a measured pressure value indicative of the pressure applied at port 30, such as in pounds per square inch (PSI) for example. Alternatively, processor 310 may read 470 an input from pressure sensor 340 and process 475 that input responsive to a temporally extended actuation of power selector 32, for example. Lighting element 35 may be selectively activated in an analogous manner. The calculated pressure may then be displayed 480 by processor 310 using portion 210 of display 40, for example.

Thus, according to an aspect of the present invention, operation of device 10 advantageously enables a user to easily compare an actual pressure reading of a tire against a target or desired pressure for that tire, even in adverse lighting or weather conditions for example.

Referring now also to FIGS. 5A and 5B, there are shown views of a device 500 according to another aspect of the present invention. Like references have been used to identify like elements of the invention. One difference between device 500 and device 10 lies in the use of a single selector as power selector 32 and set selector 38. According to an aspect of the present invention, processor 310 may detect a period of time that selector 32/38 is activated. If the combined selector is activated for a period of time greater than a predetermined threshold, such as a few seconds for example, activation of selector 38 may be effected. Otherwise, activation of the combined selector may be processed as activation of selector 32. Further, device 500 may include a pressure measurement selector 510. Selector 510 may be coupled to an input of processor 310. According to an aspect of the present invention, processor 310 may wait to read 470 an input from pressure sensor 340 until selector 510 is activated (e.g., pause between steps 465 and 470 (FIG. 4) until selector 510 is activated). In such an embodiment, processor 310 may optionally omit determining whether the received signal exceeds a given threshold prior to receiving the signal, for example. Optionally, processor 310 may activate lighting element 35 responsively to activation of combined selector 32/38 or selector 510.

By way of non-limiting and further example only, device 500 may be about 130 mm long (length L), about 31.5 mm wide (width W). Further, display 40 may have a diameter (D) of about 38 mm.

Figure 6:
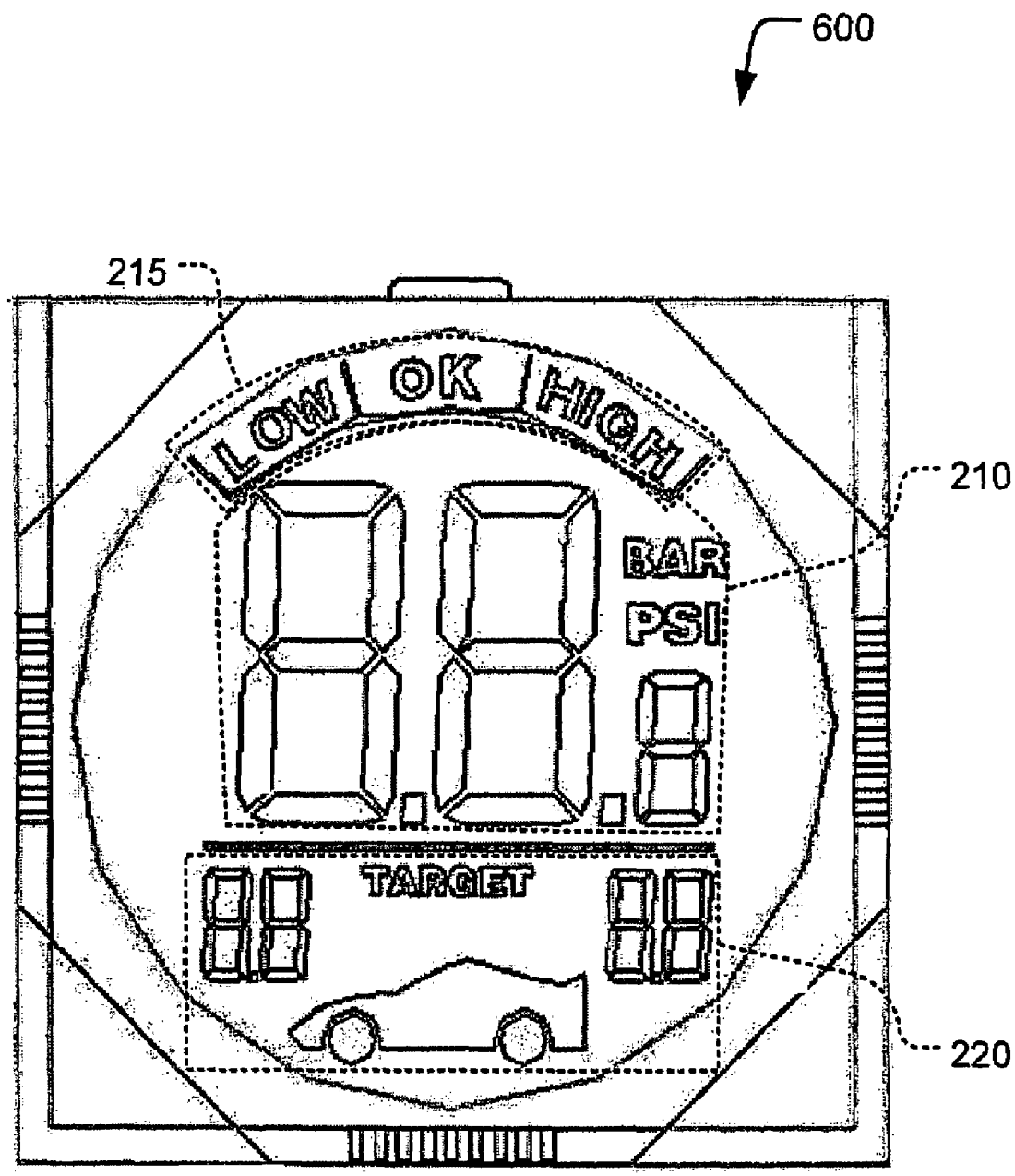

Referring now also to FIG. 6, there is shown a graphical user display 600 suitable for use with the gauge of FIGS. 5A and 5B according to an aspect of the present invention. Again like references refer to like elements of the invention. Display 600 includes display portion 215, in addition to portions 210, 220. Display portion 215 is suitable for displaying information indicative of the measured pressure, as well as information indicative of the target pressure, in a simplified and user-friendly manner. Display portion 215 may be suitable for use by persons having little experience or knowledge regarding vehicle maintenance.

In the illustrated case of FIG. 6, display portion 215 includes LOW, OK and HIGH indicators. According to an aspect of the present invention, processor 310 may compare the measured pressure with a target pressure stored in memory of the device 10 (e.g., after process step 475 in FIG. 4). Processor 310 may compare the measured pressure to the target pressure, optionally +/− some threshold value (e.g., 2 PSI). If the measured pressure is within the threshold value of the target pressure (e.g., first value +/−2), it may activate the OK indicator of display portion 215. If the measured pressure is below the target pressure less the threshold value (e.g., first value −2), it may activate the LOW indicator of display portion 215. If the measured pressure is above the target pressure plus the threshold value (e.g., first value +2), it may activate the HIGH indicator of display portion 215. Which target pressure is being used for the comparison (e.g., first value or second value of FIG. 4) may be shown using a graphical representation analogously as has been described with regard to the programming of the target pressures and changed using increment and/or decrement selectors 34, 36, for example.

According to an aspect of the invention, device 10 or 510 may be configured to store and recall multiple readings on command, using memory 320, for example. This feature may be especially useful when measuring multiple tires or multiple vehicles in one session. As an example, the device may be programmed to include an icon for "left front tire", "right rear tire" and so on, so that the user can easily access the various corresponding measurements. This may be accomplished, for example, using the set, increment and decrement selectors for example, so as to enable the storage and subsequent retrieval of multiple pressure readings.

The foregoing description of the embodiments of this invention has been presented for purposes of illustration and description. It is not intended to be exhaustive or to limit the invention to the forms explicitly disclosed, as many modifications and variations are possible without departing from the scope and spirit of the present invention.

As an example, the device's sleek design may be modified and the accompanying processing steps, electronic components or circuitry may also be changed. As a further example, while the selectors and display are positioned on the top outer surface of the device housing, such components may be positioned elsewhere on the device. These and such other modifications and variations that may be apparent to a person skilled in the art are intended to be included within the scope of this invention.

What is claimed is:

1. A handheld tire pressure gauge comprising:
a housing adapted to fit in a user's hand, the housing containing:
a memory capable of storing at least one target tire pressure value and at least one measured tire pressure value;
a display capable of presenting information in at least a graphical form;
a pressure sensor;
a processor being operatively coupled to said display, pressure sensor and memory; and
code being stored in said memory and operable by said processor to: retrieve said at least one target tire pressure value from said memory, determine a pressure sensed by said pressure sensor, and cause said display to present said target tire pressure and said pressure sensed by said pressure sensor.

2. The gauge of claim 1, further comprising:
a port disposed at an end of said housing, said port allowing said pressure sensor to be subjected to a tire pressure; and
a lighting element substantially adjacent to said port.

3. The gauge of claim 2, wherein said lighting element comprises an LED.

4. The gauge of claim 2, wherein said LED is selectively operable by said processor.

5. The gauge of claim 2, wherein said display is backlit with a color substantially complementary to a color of said lighting element.

6. The gauge of claim 2, wherein said display is backlit with a color substantially matching a color of said lighting element.

7. The gauge of claim 1 further comprising a speaker.

8. The gauge of claim 1, wherein said code is further operable by said processor to store said at least one value indicative of the target tire pressure.

9. The gauge of claim 1, wherein said code is further operable by said processor to increment and decrement said at least one value indicative of the target tire pressure.

10. The gauge of claim 1, wherein said memory is capable of storing a plurality of values each indicative of a target tire pressure.

11. The gauge of claim 1, wherein said display further comprises a graphical indicator of which of a plurality of tires on a vehicle is being measured.

12. The gauge of claim 1, wherein said code is further operable by said processor to store a value indicative of said pressure sensed by said sensor in said memory.

13. The gauge of claim 1, wherein said pressure sensor comprises a plurality of strain gauges.

14. The gauge of claim 1, wherein said display concurrently presents the target tire pressure and the sensed tire pressure.

15. The gauge of claim 1, wherein said display is capable of displaying a tire pressure value in at least two different unit systems.

16. The gauge of claim 1, wherein said display presents said sensed tire pressure for a predetermined period of time upon successful sensing of a tire pressure.

17. A method for assisting a user to compare a tire pressure with a target tire pressure using a handheld digital tire pressure gauge having a housing adapted to fit in a user's hand, comprising:
presenting graphically a tire on a display;
retrieving at least one value indicative of said target tire pressure for said displayed tire;
displaying said at least one value indicative of said target tire pressure on said display;
sensing a tire pressure; and
displaying said at least one value indicative of said target tire pressure and a value indicative of the sensed tire pressure.

18. The method of claim 17, further comprising prompting said user to input said at least one value indicative of said target tire pressure.

19. The method of claim 17, further comprising selectively activating a light.

20. A handheld tire pressure gauge comprising:
a housing adapted to fit in a user's hand, the housing containing:
a memory capable of storing at least one target tire pressure value and at least one measured tire pressure value;
a display capable of presenting information in at least a graphical form;
a pressure sensor;
a speaker;
a processor being operatively coupled to said display, pressure sensor, speaker and memory; and
code being stored in said memory and operable by said processor to:
retrieve said at least one target tire pressure value from said memory, determine a pressure sensed by said pressure sensor, cause said speaker to emit an audio signal upon successfully sensing said pressure and cause said display to present a value indicative of said sensed pressure for a predetermined period of time.

21. A handheld tire pressure gauge comprising:
a housing adapted to fit in a user's hand, the housing containing:
a memory;
a display capable of presenting information in at least a graphical form;
a pressure sensor;
a port at a first end of said housing, said port allowing said pressure sensor to be subjected to a tire pressure;
a lighting source disposed substantially adjacent to said port;
a processor being operatively coupled to said display, memory and pressure sensor; and
code being stored in said memory and operable by said processor to:
retrieve said at least one target tire pressure value from said memory, determine a tire pressure sensed by said pressure sensor, and cause said display to present said at least one target pressure value and said tire pressure sensed by said pressure sensor.

* * * * *